(12) United States Patent
Nishiguchi et al.

(10) Patent No.: US 7,560,162 B2
(45) Date of Patent: Jul. 14, 2009

(54) ELECTRODEPOSITION COATING COMPOSITION, COATING METHOD AND COATED ARTICLE

(75) Inventors: Shigeo Nishiguchi, Kanagawa (JP); Masaharu Shimoda, Kanagawa (JP); Tadayoshi Hiraki, Kanagawa (JP); Koji Kamikado, Kanagawa (JP)

(73) Assignees: Kansai Paint Co., Ltd., Kanagawa (JP); Toyota Jidosha Kabushiki Kaisha, Aichi (JP)

( * ) Notice: Subject to any disclaimer, the term of this patent is extended or adjusted under 35 U.S.C. 154(b) by 458 days.

(21) Appl. No.: 11/375,076

(22) Filed: Mar. 15, 2006

(65) Prior Publication Data

US 2006/0211831 A1   Sep. 21, 2006

(30) Foreign Application Priority Data

Mar. 17, 2005   (JP)   ............................ 2005-076915

(51) Int. Cl.
- *B32B 27/38*   (2006.01)
- *C25D 9/02*    (2006.01)
- *C08L 63/00*   (2006.01)
- *B32B 15/092*  (2006.01)

(52) U.S. Cl. ...................... 428/413; 205/316; 205/317; 525/523; 525/528; 525/529

(58) Field of Classification Search ................ 205/316, 205/317, 320; 523/402; 525/523, 528, 529; 428/413, 418
See application file for complete search history.

(56) References Cited

U.S. PATENT DOCUMENTS

| | | | |
|---|---|---|---|
| 4,457,790 A | | 7/1984 | Lindert et al. |
| 4,872,960 A | * | 10/1989 | Keene et al. ................. 204/500 |
| 4,970,264 A | * | 11/1990 | Lindert et al. ............ 525/328.8 |
| 5,089,542 A | * | 2/1992 | Nishida et al. .............. 523/410 |
| 2003/0221964 A1 | * | 12/2003 | Kasahara et al. ............ 204/484 |

FOREIGN PATENT DOCUMENTS

| | | | |
|---|---|---|---|
| JP | 60-161973 A1 | 8/1985 |
| JP | 60-166675 A1 | 8/1985 |
| JP | 60-170620 A1 | 9/1985 |
| JP | 62-135467 A1 | 6/1987 |
| JP | 02-000608 A  | 1/1990 |
| JP | 02-265975 A1 | 10/1990 |
| JP | 07-166111 A  | 6/1995 |

* cited by examiner

*Primary Examiner*—Michael J Feely
(74) *Attorney, Agent, or Firm*—Rader, Fishman & Grauer, PLLC

(57) ABSTRACT

A coated article is obtained by electrodeposition coating using an electrodeposition coating composition, which comprises: (A) a resin component obtained by reacting an epoxy resin, an amino compound and/or a phenolic compound; (B) a resin component having a specific structural unit; (C) a blocked polyisocyanate compound; and (D) at least one rust inhibiting component selected from the group consisting of metal ions selected from zirconium, titanium, cobalt, vanadium, tungsten and molybdenum, oxymetal ions of the metal, and fluorometal ions of the metal.

6 Claims, No Drawings

ELECTRODEPOSITION COATING COMPOSITION, COATING METHOD AND COATED ARTICLE

RELATED APPLICATION

This application claims a benefit of priority based on earlier filed Japanese Patent Application No. 2005-076915 filed on Mar. 17, 2005, the contents of which are incorporated herein by reference in their entirety.

TECHNICAL FIELD

The present invention relates to an electrodeposition coating composition excellent in corrosion resistance, electrodeposition properties on a rustproof steel plate and stability of the coating composition, an electrodeposition coating method using the coating composition, and an article coated therewith.

BACKGROUND ART

Automobile bodies have conventionally been treated with zinc phosphate as bed treatment in order to improve corrosion resistance and adhesion. Since a zinc phosphate treating agent used for chemical conversion treatment contains therein much phosphorus or nitrogen and also contains much heavy metals such as nickel and manganese for improving the performance of the resulting chemical film, its adverse effect on the environment cannot be neglected and further, this chemical conversion treatment has a problem of industrial waste disposal owing to a large amount of sludge of zinc phosphate and iron phosphate remaining after the treatment.

As a corrosion-preventive primer coating for automobile bodies, an electrodeposition coating composition containing an aqueous dispersion of a water dispersible and electrodepositable cationic resin and a water soluble salt of zinc is proposed, as disclosed in Japanese Laid-Open Patent Publication No. 7-166111 (1995). This electrodeposition coating composition containing a water soluble salt of zinc such as zinc lactate or zinc acetate has problems in the stability of the coating composition and finish appearance.

An invention relating to an aqueous solution for metal surface treatment containing from about 0.001 to 1.0 wt. % of a metal ion selected from the group consisting of titanium ion, zirconium ion and hafnium ion and mixtures thereof, a polymer having a specific structural formula, acid salt thereof, or a mixture thereof is already disclosed in Japanese Laid-Open Patent Publication No. 59-207972 (1984).

Also an invention relating to a composition containing an aqueous solution of a specific polymer material or copolymer compound, and a solution or dispersion of a compound of titanium, zirconium, hafnium or silicon is disclosed in Japanese Laid-Open Patent Publication No. 2-608 (1990).

In electrodeposition coating compositions, when voltage is applied to a metal article to be coated after dipping it in the coating composition, charges transfer from the electrodeposition coating composition to the article and precipitation occurs. The wet film thus precipitated is then baked and dried, followed by fusion of the film to form a continuous film. During precipitation of the film, however, existence of foreign ions (such as $Na^+$ and $PO^{3-}$) causes abnormal precipitation or disturbs smooth fusion of the film because of an abnormally concentrated current flow to a portion of the film, which sometimes leads to deterioration in finish appearance. For example, single use of the metal ion or polymer composition as described in Japanese Laid-Open Patent Publication No. 59-207972 or Japanese Laid-Open Patent Publication No. 2-608 (1990) for an electrodeposition coating composition causes aggregation in the coating composition, thereby impairing the stability of the coating composition or deteriorating the finish appearance of the coating.

SUMMARY OF THE INVENTION

An object of the invention is to provide an electrodeposition coating composition excellent in corrosion resistance, electrodeposition coating properties on a rustproof steel plate, and stability of the coating composition.

The present inventors have carried out an extensive investigation. As a result, it has been found that a coated article is obtained by electrodeposition coating using an electrodeposition coating composition comprising (A) a resin component obtained by reacting an epoxy resin, an amino compound and/or a phenolic compound, (B) a resin component having a specific structural unit, (C) a blocked polyisocyanate compound and (D) at least one rust inhibiting component selected from the group consisting of metal ions selected from zirconium, titanium, cobalt, vanadium, tungsten and molybdenum, oxymetal ions of the metal, and fluorometal ions of the metal, leading to the completion of the invention.

The film formed using the electrodeposition coating composition of the invention is excellent in corrosion resistance and finish appearance, and also has good stability of the coating composition. Since the film formed using the electrodeposition coating composition of the invention has excellent corrosion resistance, an article directly subjected to electrodeposition coating without forming a chemical conversion treatment film therebetween has at least equal corrosion resistance to an article subjected to chemical conversion treatment in a ordinary manner to form a chemical conversion treatment film, followed by electrodeposition coating.

Use of the electrodeposition coating composition of the invention makes it possible to save the labor and cost necessary for chemical conversion treatment or maintenance of the equipment. In addition, the electrodeposition coating composition of the invention has excellent stability of the coating composition so that neither corrosion resistance nor finish appearance changes even if it is used in a long-hour coating line.

The reason why the electrodeposition coating composition of the invention is excellent in stability of the coating composition and film performance as described above is not elucidated. However, an electrodeposition coating composition excellent in curing property of a film, stability of the coating composition and finish appearance can be obtained using the resin component (A), resin component (B) and blocked polyisocyanate compound (C) in combination. In addition, the rust inhibiting component (D) tends to precipitate on the interface of the electrodeposited film and the film of a metal oxide formed by the resulting ion contributes to suppression of corrosion below the film so that a film having excellent corrosion resistance can be obtained.

DETAILED DESCRIPTION OF THE INVENTION

The present invention will hereinafter be described more specifically.

Resin Component (A):

In the electrodeposition coating of the invention, the resin component (A) is obtained by reacting ($b_1$) an epoxy resin having, in one molecule thereof, at least two epoxy-containing functional groups represented by the following formula (1):

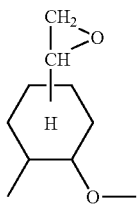

and ($b_2$) an amino compound and/or ($b_3$) a phenolic compound.

Epoxy Resin ($b_1$):

The epoxy resin (b1) is itself a known substance. As this epoxy resin, those described, for example, in Japanese Patent Laid-Open Publication Nos. 60-170620 (1985), 62-135467 (1987), 60-166675 (1985), 60-161973 (1985) and 2-265975 (1990) can be used.

The epoxy resin ($b_1$) can be prepared, for example, by using 4-vinylcyclohexen-1-oxide singly or using it in combination with another epoxy-containing compound in the presence of an active-hydrogen-containing organic compound as an initiator, carrying out ring-opening (co)polymerization reaction by the epoxy group contained in each of them to form a polyether resin, and then epoxidizing the vinyl group existing in the side chain of the resulting resin with an oxidizer such as peracid or hydroperoxide.

4-vinylcyclohexen-1-oxide is available by partial epoxidation of vinylcyclohexane, which has been obtained by the dimerization of butadiene, with peracetic acid.

Although no particular limitation is imposed on the another epoxy-containing compound which is copolymerizable insofar as it has an epoxy group, a compound having in one molecule thereof one epoxy group is preferred from the viewpoint of the production. Specific examples include ethylene oxide, propylene oxide, butylene oxide, α-olefin epoxide represented by the following formula:

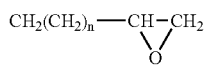

(wherein n stands for an integer of from 2 to 25), oxides of an unsaturated compound such as styrene oxide, glycidyl ethers of a hydroxyl-containing compound such as allyl glycidyl ether, 2-ethylhexyl glycidyl ether, methyl glycidyl ether, butyl glycidyl ether and phenyl glycidyl ether, and glycidyl esters of an organic acid such as fatty acid.

Additional examples of the another epoxy-containing compound include alicyclic oxirane-containing vinyl monomers having an unsaturated bond. Specific examples include the following compounds:

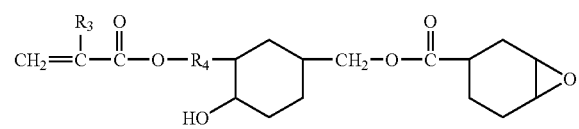

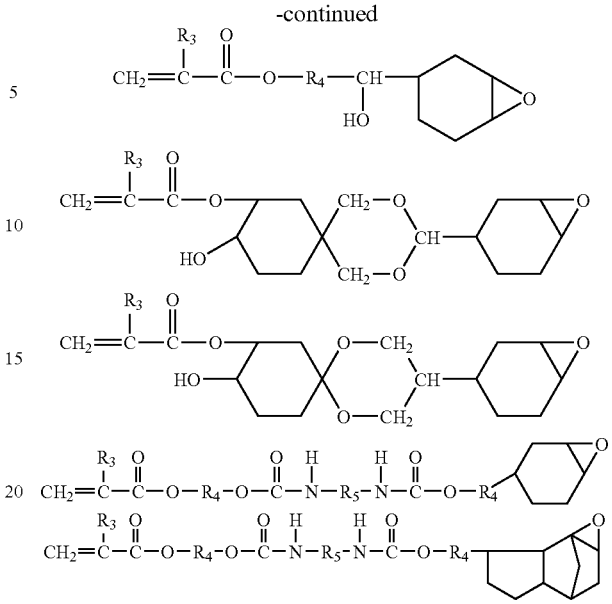

(wherein, $R_3$ represents a hydrogen atom or a methyl group, $R_4$ represents a divalent aliphatic saturated $C_{1-6}$ hydrocarbon group, and $R_5$ represents a divalent $C_{1-10}$ hydrocarbon group.

In the above formulas, examples of the divalent aliphatic saturated $C_{1-6}$ hydrocarbon group represented by $R_4$ include linear or branched alkylene groups such as methylene, ethylene, propylene, tetramethylene, ethylethylene and pentamethylene. Examples of the divalent $C_{1-10}$ hydrocarbon group represented by $R_5$ include methylene, ethylene, propylene, tetramethylene, ethylethylene, pentamethylene, hexamethylene, polymethylene, phenylene and compounds of the following formulas:

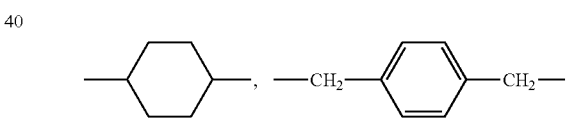

Further examples of the another epoxy-containing compound include compounds represented by the following formula:

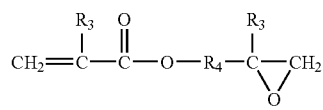

(wherein, $R^3$ and $R^4$ have the same meanings as described above and $R^3$ represents a hydrogen atom or a methyl group and $R^4$ represents a divalent aliphatic saturated $C_{1-6}$ hydrocarbon group).

Examples of the divalent aliphatic saturated $C_{1-6}$ hydrocarbon group represented by $R_4$ include linear or branched alkylene groups such as methylene, ethylene, propylene, tetramethylene, ethylethylene and pentamethylene). Specific examples include glycidyl acrylate and glycidyl methacrylate; and compound having an alicyclic unsaturated group represented by the following formula:

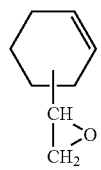

which is partially by-produced by the partial epoxidation of vinyl cyclohexane. Furthermore, 4-vinylcycloheptene (vinylnorbornene) can also be used.

The ring-opening (co)polymerization reaction of an epoxy group using 4-vinylcyclohexen-1-oxide singly or using it in combination with another epoxy-containing compound is preferably performed in the presence of an active-hydrogen-containing organic compound and a catalyst.

Examples of the active-hydrogen-containing organic compound include alcohols such as aliphatic monohydric alcohols, aromatic monohydric alcohols, aliphatic or alicyclic polyalcohols having two or more hydroxyl groups; phenols; fatty acids; aliphatic, alicyclic or aromatic dibasic acids or polybasic acids; oxy acids; polyvinyl alcohol, partial hydrolysates of polyvinyl acetate, starches, celluloses, cellulose acetate, cellulose acetate butyrate, hydroxyethyl cellulose, allylpolyol resins, styrene-allyl alcohol copolymer resins, alkyd resins, polyester polyol resins and polycaprolactone polyol resins. These active-hydrogen-containing organic compounds may have, in the skeleton thereof, an epoxidized unsaturated double bond as well as active hydrogen. They may have a residue of a polymerization initiating component, that is, an active-hydrogen-containing organic compound residue, bonded to the end portion of the compound.

Examples of the catalyst include amines such as methylamine, ethylamine, propylamine and piperazine; organic bases such as pyridines and imidazoles; organic acids such as formic acid, acetic acid and propionic acid; inorganic acids such as sulfuric acid and hydrochloric acid; alkali metal alcoholates such as sodium methylate; alkalis such as KOH and NaOH; Lewis acids such as $BF_3SnCl_2$, $AlCl_3$ and $SnCl_4$ and complex thereof; and organic metal compounds such as triethylaluminum and diethyl zinc.

These catalysts may be used usually in an amount of from 0.001 to 10 wt. %, preferably from 0.1 to 5 wt. % relative to the reaction product. The ring-opening (co)polymerization reaction may be performed usually at a temperature range of from −70 to 200° C., preferably from −30 to 100° C. This reaction is conducted preferably in a solvent. Ordinary organic solvents having no active hydrogen can be used as the solvent.

The polyether resin (ring-opened (co)polymer) thus obtained is converted into the epoxy resin ($b_1$) having a functional group of the formula (1) by epoxidizing the vinyl group (—CH=$CH_2$) directly bonded to the carbon atom of the alicyclic structure of the side chain of the polyether resin.

The epoxidation may be performed using a peracid or hydroperoxide. Examples of the peracid include performic acid, peracetic acid, perbenzoic acid and trifluoroperacetic acid. Examples of the hydroperoxide include hydrogen peroxide, tert-butyl peroxide and cumene oxide. Epoxidation reaction may be performed in the presence of a catalyst as needed.

By epoxidation of the vinyl group of the 4-vinylcyclohexen-1-oxide in the ring-opened (co)polymer, the functional group represented by the formula (1) is formed. In this epoxidation reaction, existence of the alicyclic oxirane-containing compound as the another epoxy-containing compound may also cause epoxidation of the vinyl group contained in the compound, but the resulting functional group is different from that represented by the formula (1).

Use of a solvent or not, or reaction temperature in the epoxidation reaction can be adjusted as needed depending on apparatuses and raw materials employed for the reaction. Upon epoxidation of the vinyl group in the raw material polymer, a substituent represented by the following formula:

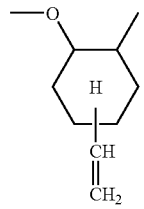

in the raw material and/or substituent of the formula (1) formed by the reaction causes a secondary reaction with the epoxidation agent to generate a modified substituent, though depending on conditions for the epoxidation reaction. The modified substituents sometimes exist in the epoxy resin ($b_1$).

A ratio of such modified substituents contained in the resin differs, depending on the kind of the epoxidation agent, a molar ratio of epoxidation agent to vinyl group and reaction conditions.

Commercially available products such as "EHPE 3150" (trade name; product of Daicel Chemical) can also be used as the epoxy resin ($b_1$). It is an epoxidation product of a vinyl group in the ring-opened polymer of 4-vinylcyclohexen-1-oxide and has an average polymerization degree of from 15 to 25.

The epoxy resin ($b_1$) has, in one molecule thereof, preferably at least two epoxy-containing functional groups represented by the formula (1) and it has an epoxy equivalent preferably falling within a range of from 140 to 1000, more preferably from 170 to 300 and has a number average molecular weight (note 1) falling within a range of form 200 to 50000, more preferably from 1000 to 10000.

(Note 1) number average molecular weight: measured in accordance with JIS K 0124(2002) and determined by calculation based on a calibration curve of polystyrene and chromatogram obtained by using an RI refractometer while using "TSK GEL4000HXL+G3000HXL+G2500HXL+G2000 HXL" (product of TOSOH) as a separation column, temperature of 40° C., a flow rate of 1.0 ml/min, and tetrahydrofuran for GPC as an eluent.

Amino Compound ($b_2$):

The amino compound ($b_2$) to be reacted with the epoxy resin ($b_1$) is a component for introducing an amino group into the epoxy resin matrix, thereby cationizing the epoxy resin and the amino compound ($b_2$) contains at least one active hydrogen which reacts with the epoxy group.

Examples of the amino compound ($b_2$) include mono- or dialkylamines such as monomethylamine, dimethylamine, monoethylamine, diethylamine, monoisopropylamine, diisopropylamine, monobutylamine and dibutylamine; alkanolamines such as monoethanolamine, diethanolamine, mono(2-hydroxypropyl)amine, di(2-hydroxypropyl)amine, tri(2-hydroxypropyl)amine, monomethylaminoethanol and monoethylaminoethanol; alkylenepolyamines such as ethylenediamine, propylenediamine, butylenediamine, hexamethylenediamine, tetraethylenepentamine, pentaethylenehexamine, diethylaminopropylamine, diethylenetriamine, and triethylenetetramine, and ketiminated products of these polyamines; alkyleneimines such as ethyleneimine and propyleneimine; and cyclic amines such as piperazine, morpholine and pyrazine.

Additional examples of the amino compound ($b_2$) may include compounds having, in one molecule thereof, a hydroxyl group, a secondary amino group and an amide group and represented by the following formula:

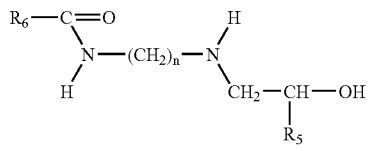

(wherein, n stands for an integer of from 1 to 6, $R_5$ represents a hydrogen atom or a $C_{1-2}$ alkyl group, and $R_6$ represents a $C_{4-36}$ hydrocarbon group which may have a hydroxyl group and/or a polymerizable unsaturated bond).

The amino compound of the formula (8) can be prepared, for example, by adding about one mole of $C_{5-37}$, preferably $C_{8-23}$ monocarboxylic acid to about 1 mole of N-hydroxyalkylalkylenediamine as shown in the following reaction scheme:

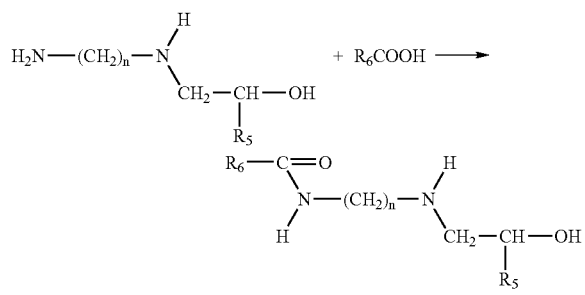

(wherein, $R_5$, $R_6$ and n have the same meanings as described above).

Examples of the diamine usable in the above reaction include hydroxyethylaminoethylamine, N-hydroxyethylethylenediamine, N-hydroxyethylpropylenediamine, N-hydroxyethylbutylenediamine, N-hydroxyethylpentylenediamine, N-hydroxyethylhexylenediamine, N-(2-hydroxy)propylethylenediamine, N-(2-hydroxy)propylpropylenediamine, N-(2-hydroxy)propylbutylenediamine, N-(2-hydroxy)propylpentylenediamine and N-(2-hydroxy)propylhexylenediamine. Of these, hydroxyethylaminoethylamine and N-hydroxyethylpropylenediamine are suited.

Examples of the monocarboxylic acid include mixed fatty acids such as coconut oil fatty acid, castor oil fatty acid, rice bran oil fatty acid, soybean oil fatty acid, tall oil fatty acid, dehydrated castor oil fatty acid, safflower oil fatty acid, linseed oil fatty acid, and wood oil fatty acid; caprylic acid, capric acid, lauric acid, myristic acid, palmitic acid, stearic acid, oleic acid, ricinoleic acid, linoleic acid, linolenic acid, eleostearic acid, 12-hydroxystearic acid and behenic acid. Of these, stearic acid, oleic acid and 12-hydroxystearic acid and mixed fatty acids containing them are preferred.

The N-hydroxyalkylalkylenediamine and monocarboxylic acid are reacted, for example, by mixing them at an almost equal molar ratio, removing a specified amount of water generated by the reaction by using an organic solvent such as toluene and methyl isobutyl ketone and removing the remaining organic solvent by the pressure evacuation or the like.

Phenolic Compound ($b_3$)

Phenolic compounds having, in one molecule thereof, at least one phenolic hydroxyl group can be used as the phenolic compound ($b_3$). Specific examples include polyphenolic compounds such as 2,2-bis(p-hydroxyphenyl)propane, 4,4'-dihydroxybenzophenone, 1,1-bis(p-hydroxyphenyl)ethane, 1,1-bis(p-hydroxyphenyl)isobutene, 2,2-bis(4-hydroxy-3-tert-butylphenyl)propane, bis(2-hydroxynaphthyl)methane, 1,5-dihydroxynaphthalene, bis(2,4-dihydroxyphenyl)methane, 1,1,2,2-tetra(p-hydroxyphenyl)ethane, 4,4-dihydroxydiphenylether, 4,4-dihdyroxydiphenylsulfone, phenol novolac, and cresol novolac.

Additional examples include monophenolic compounds such as phenol, nonylphenol, α- or β-naphthol, p-tert-octylphenol and o- or p-phenylphenol.

In order to form a film having superior corrosion resistance, a bisphenol resin such as bisphenol A [2,2-bis(p-hydroxyphenyl)propane] or bisphenol F [bis(p-hydroxyphenyl)methane] is preferably used as the phenolic compound ($b_3$).

Of the bisphenol resins, especially preferred are those having a number average molecular weight of 200 or greater, preferably from about 800 to 3000, having 2 or less, preferably 0.8 to 12 phenolic hydroxyl groups on average per one molecule and represented by the following formula:

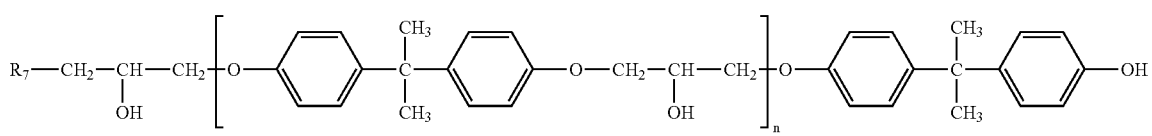

(wherein, n stands a number of from 0 to 7 on average and $R_7$ represents a residue of an active-hydrogen-containing compound).

Examples of the active hydrogen-containing compound which is a precursor of $R_7$ in the above formula include amines such as secondary amines, phenols such as nonylphenol, organic acids such as fatty acids, thiols, alcohols such as alkyl alcohols and carbitol, and inorganic acids.

Of these, dialkanolamines which are secondary amines having a primary hydroxyl group, and monophenols such as nonylphenol, phenylphenol and phenol are most preferred. In particular, use of the primary-hydroxy-containing amine improves curing property and also stability.

In the above formula, the compound has $R_7$— and —OH bonded to the both terminals thereof respectively. Instead, it may contain either $R_7$— or —OH bonded to the both terminals.

In addition, as the phenolic compound ($b_3$), it is possible to use a compound available by reacting 1 mole of a bisphenol A diglycidyl ether type polyepoxide having a molecular weight of 200 or greater, preferably within a range of from 380 to 2000, 1 mole of a bisphenol A type polyphenol having a molecular weight of 200 or greater, preferably within a range of from 200 to 2000, and 1 mole of an active-hydrogen-containing compound at 30 to 300° C., preferably at 70 to 180° C., if necessary in the presence of a catalyst or solvent. The above-described molar ratio is not intended to be limiting but rather exemplary. It can be selected as desired.

Further examples of the compound usable as the phenolic compound ($b_3$) include polyols such as dimer diol, ethylene glycol, propylene glycol, and butylene glycol; polyether glycols such as polyethylene glycol, polypropylene glycol, and polybutylene glycol; polyester polyols such polycaprolactone; polycarboxylic acids; polyisocyanates; monoisocyanates; oxides of an unsaturated compound such as ethylene oxide, propylene oxide, butylene oxide, and styrene oxide; glycidyl ethers of a hydroxyl-containing compound such as allyl glycidyl ether, polypropylene glycol diglycidyl ether, 2-ethylhexyl glycidyl ether, methyl glycidyl ether, butyl glycidyl ether, and phenyl glycidyl ether; glycidyl esters of an organic acid such as fatty acid; and compounds obtained by reacting an alicyclic oxirane-containing compound with bisphenol A. Further, compounds obtained by graft polymerization of δ-4-caprolactone, acrylic monomer or the like on the above-described compounds may be used.

The resin component (A) is available by reacting the above-described epoxy resin ($b_1$) with the amino compound ($b_2$) and/or phenolic compound ($b_3$).

Such a resin component (A) is superior to a resin component obtained by the reaction with a conventional bisphenol A type epoxy resin from the viewpoint that the stability of the coating composition is not impaired even by the addition of the rust inhibiting component (D).

No particular limitation is imposed on the reaction ratio of the epoxy resin ($b_1$), amino compound ($b_2$) and phenolic compound ($b_3$) and it can be selected as needed, depending on the using purpose of the coating resin thus obtained. The amino compound ($b_2$) is preferably used in an amount of from 0.1 to 1 mole, especially from 0.4 to 0.9 mole in terms of the primary or secondary amino group, and the phenolic compound ($b_3$) is preferably used in an amount of from 0.02 to 0.4 mole, especially from 0.1 to 0.3 mole in terms of the phenolic hydroxyl group of the phenolic compound, each per mole of the epoxy-containing functional group of the epoxy resin ($b_1$).

The total mole number of the amino compound ($b_2$) and the phenolic compound ($b_3$) is preferably from 0.75 to 1.4 moles, especially preferably from 0.8 to 1.2 moles per mole of the epoxy-containing functional group in the epoxy resin ($b_1$).

The reaction of these components can be conducted, for example, within a temperature range of from 50 to 300° C. especially from 70 to 200° C. The reaction order is not particularly limited. All the components may be charged simultaneously and reacted, or the reaction may be effected sequentially by adding, to the epoxy resin ($b_1$), the other components in a desired order.

It is preferred that the resin component (A) has usually an amine number falling within a range of from 20 to 150 mgKOH/g, especially from 35 mg to 120 mgKOH/g; a hydroxyl equivalent falling within a range of from 300 to 1000 mgKOH/g, especially from 350 to 700 mgKOH/g; and a number average molecular weight (note 1) falling within a range of from 800 to 15000, especially from 1000 to 6000.

The resin component (A) has excellent water dispersibility because different from the conventional cationic resins, they have a hydrophobic portion and a hydrophilic portion in the polarized form.

The resin component (A) may be reacted further with the below-described cationization agent as needed during or after preparation of it. As such a cationization agent, tertiary amines such as triethylamine, triethanolamine, N,N-dimethylethanolamine, N-methyldiethanolamine, N,N-diethylethanolamine, and N-ethyldiethanolamine may be used. They can be converted into quaternary salts by protonating them with an acid in advance, and then reacting with an epoxy group.

In addition to the above-described amino compounds, tertiary sulfonium salts obtained by reacting, with an epoxy group, salts of sulfides such as diethyl sulfide, diphenyl sulfide, tetramethylene sulfide and thiodiethanol and boric acid, carbonic acid, organic moncarboxylic acid or the like can be used as the cationization agent.

Further, quaternary phosphonium salts obtained by reacting salts of tertiary phosphines such as triethylphosphine, phenyldimethylphosphine, diphenylmethylphosphine, and triphenylphosphine and acids such as formic acid, acetic acid, lactic acid and glycolic acid can be used as the cationization agent.

Resin Component (B)

The resin component (B) is a resin component selected from resins having the unit of a structural formula represented by the following formula (2):

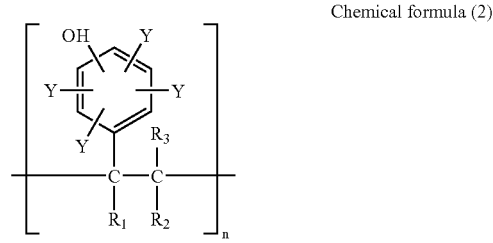

Chemical formula (2)

(wherein, $R_1$ to $R_3$ each represents a hydrogen atom or a $C_{1-5}$ alkyl group, Y represents a hydrogen atom, $CR_4R_5OR_6$, $CH_2Cl$, $C_{1-8}$ alkyl group, $C_{1-18}$ aryl group or Z, Z is represented by the following formula (3):

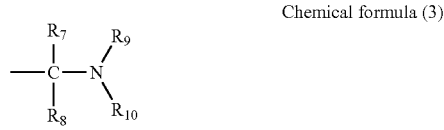

Chemical formula (3)

wherein $R_4$ to $R_{10}$ each represents a hydrogen atom, alkyl group, aryl group, hydroxylalkyl group, aminoalkyl group, mercaptoalkyl group or phosphoalkyl group, and n stands for an integer of from 2 to 400); acid salts of the resin; and mixtures thereof.

In the resin component (B), a ratio of Z represented by the formula (3) to the unit of the structural formula represented by the formula (2) falls within a range of from 0.1 to 2, preferably from 0.2 to 1.5, preferably from 0.2 to 1.5 as a ratio of the mole number of Z represented by the formula (3)/the mole number of the benzene ring in the unit of the structural formula represented by the formula (2).

The resin component (B) is composed mainly of a derivative of a polyalkenylphenol resin. Examples include vinylphenol, isopropenylphenol, isobutenylphenol and dimethylvinylphenol.

The resin component (B) represented by the formula (2) is obtained by the Mannich reaction, for example, by reacting poly-4-vinylphenol with formaldehyde and a secondary amine. The polyalkenylphenol has a molecular weight preferably from 240 to 50,000, more preferably from 480 to 30,000. In the resin component (B) selected from the resins having a unit of the structural formula represented by the formula (2) or acid salts thereof, or mixtures thereof, n preferably stands for from 2 to 400 and the carbon chain length of each of the substituents $R_4$ to $R_{10}$ is from about 1 to 18, preferably from about 1 to 12.

The resin component (B) can be dissolved in an organic solvent or water. In order to make the resin component (B) water soluble or water dispersible, a portion of Z is neutralized with an organic acid or an inorganic acid, for example, acetic acid, citric acid, oxalic acid, ascorbic acid, phenylphosphonic acid, chloromethylphosphonic acid, mono-, di- or trichloroacetic acid, trifluorophosphonacetic acid, nitric acid, phosphate, hydrofluoric acid, sulfuric acid, boric acid, hydrochloric acid, hexafluorosilicic acid, hexafluorotitanic acid or hexafluorozirconic acid and then added with water. In such a manner, a water soluble or water dispersible emulsion of the resin component can be obtained.

Blocked Polyisocyanate Compound (C):

As the blocked polyisocyanate compound (C), conventionally known ones can be used. Examples include aromatic, aliphatic or alicyclic polyisocyanate compounds such as tolylene diisocyanate, xylylene diisocyanate, phenylene diisocyanate, diphenylmethane-2,4'-diisocyanate, diphenylmethane-4,4'-diisocyanate (usually called "MDI"), crude MDI, bis(isocyanatomethyl)cyclohexane, tetramethylene diisocyanate, hexamethylene diisocyanate, methylene diisocyanate and isophorone diisocyanate; cyclic polymers or isocyanate biurets of these polyisocyanate compounds; and terminated isocyanate compounds obtained by reacting an excess amount of these polyisocyanate compounds with a low-molecular-weight active-hydrogen-containing compound such as ethylene glycol, propylene glycol, trimethylol propane, hexanetriol or castor oil. These compounds may be used either singly or in combination of two or more.

Blocking agents are added to the isocyanate group of the polyisocyanate compound to block it therewith. The blocked polyisocyanate compounds obtained by this addition reaction are desired to be stable at normal temperature, but able to dissociate the blocking agent, thereby producing a free isocyanate group when heated to a baking temperature (usually at from about 100 to 200° C.) of the film.

Specific examples of the blocking agent capable of satisfying such a requirement include lactam compounds such as ε-caprolactam and γ-butyrolactam; oxime compounds such as methyl ethyl ketoxime and cyclohexanone oxime; phenolic compounds such as phenol, para-t-butylphenol and cresol; aliphatic alcohols such as n-butanol and 2-ethylhexanol; aromatic alkyl alcohols such as phenylcarbinol and methylphenylcarbinol; and ether alcohol compounds such as ethylene glycol monobutyl ether and diethylene glycol monoethyl ether. As well as these blocking agents, diols having two hydroxyl groups different in reactivity and having a molecular weight of from 76 to 150 and carboxyl-containing diols having a molecular weight of from 106 to 500 can also be used as the blocking agent.

The above-described diols may have two hydroxyl groups different in reactivity, for example, a primary hydroxyl group and a secondary hydroxyl group, a primary hydroxyl group and a tertiary hydroxyl group, or a secondary hydroxyl group and a tertiary hydroxyl group, and having a molecular weight of from 76 to 150. Examples include diols having two hydroxyl groups different in reactivity such as propylene glycol, dipropylene glycol, 1,3-butanediol, 1,2-butanediol, 3-methyl-1,2-butanediol, 1,2-pentanediol, 1,4-pentanediol, 3-methyl-4,3-pentanediol, 3-methyl-4,5-pentanediol, 2,2,4-trimethyl-1,3-pentanediol, 1,5-hexanediol and 1,4-hexanediol.

The above-described carboxyl-containing diols are, for example, 2,2-dimethylolpropionic acid, 2,2-dimethylolbutanoic acid, dimethylolvaleric acid and glyceric acid.

In the electrodeposition coating composition of the present invention, it is possible to add the resin component (A) in an amount of from 50 to 80 wt. %, preferably from 55 to 75 wt. %, the resin component (B) in an amount of from 0.5 to 25 wt. %, preferably from 0.6 to 15 wt. %, and the blocked polyisocyanate compound (C) in an amount of from 5 to 40 wt. %, preferably from 10 to 30 wt. %, each based on the total weight of the solid contents of the resin component (A), resin component (B) and blocked polyisocyanate compound (C). Stability of the coating composition and finish appearance are not impaired even by the existence of the rust inhibiting component (D) which will be described next.

Rust Inhibiting Component (D):

The electrodeposition coating composition of the invention contains at least one rust inhibiting component (D) selected from the group consisting of metal ions selected from zirconium, titanium, cobalt, vanadium, tungsten and molybdenum, and oxymetal ions and fluorometal ions thereof. Since the rust inhibiting component (D) contains a compound (which will hereinafter be called "metal ion compound") capable of producing such a metal ion in the electrodeposition coating composition, it can impart the electrodeposited film with corrosion resistance.

Compounds capable of producing a zirconium ion in the electrodeposition coating composition include, for example, zirconium nitrate, zirconium sulfate, and zirconium chloride; those capable of producing an oxymetal ion include zirconyl nitrate, zirconyl acetate and zirconyl sulfate; those capable of producing a fluorometal ion include zirconium hydrofluoric acid, salts of zirconium hydrofluoric acid (such as sodium salt, potassium salt, lithium salt and ammonium salt).

Compounds capable of producing a titanium ion in the electrodeposition coating composition include, for example, titanium chloride and titanium sulfate; compounds capable of producing a fluorometal ion include titanium hydrofluoric acid, and salts of titanium hydrofluoric acid (such as sodium salt, potassium salt, lithium salt and ammonium salt).

Compounds capable of forming a cobalt ion in the electrodeposition coating composition include, for example, cobalt chloride, cobalt bromide, cobalt iodide, cobalt nitrate, cobalt sulfate, cobalt acetate, and ammonium cobalt sulfate.

Compounds producing an oxymetal ion of vanadium in the electrodeposition coating composition include, for example, lithium orthovanadate, sodium orthovanadate, lithium metavanadate, potassium metavanadate, sodium metavanadate, ammonium metavanadate, sodium pyrovanadate, vanadyl chloride and vanadyl sulfate.

Compounds capable of producing an oxymetal ion of tungsten in the electrodeposition coating composition include, for example, lithium tungstate, sodium tungstate, potassium tungstate, sodium metatungstate, sodium paratungstate, ammonium pentatungstate, ammonium heptatungstate, sodium pentatungstate, ammonium heptatungstate, sodium phosphotungstate and barium borotungstate.

Compounds capable of producing an oxymetal ion of molybdenum in the electrodeposition coating composition include, for example, lithium molybdate, sodium molybdate, potassium molybdate, ammonium heptamolybdate, calcium molybdate, magnesium molybdate, strontium molybdate, barium molybdate, phosphomolybdic acid, sodium phosphomolybdate and zinc phosphomolybdate.

These metal ion compounds can be used either singly or in combination of two or more. Of the above-described metal ion compounds, zirconium hydrofluoric acid, titanium hydrofluoric acid and zirconyl nitrate are especially suited.

The amount of the metal ion compound added to the electrodeposition coating composition can be changed, depending on the using purpose of the coating composition. The metal ion compound is usually added preferably in an amount of from 0.01 to 30 wt. %, more preferably from 0.03 to 25 wt. %, still more preferably from 0.1 to 20 wt. % based on the total solid contents of the resin component (A), resin component (B) and blocked polyisocyanate compound (C). From the viewpoint of stability of the coating composition, it is added preferably in an amount of from 0.001 to 10 wt. %, more preferably from 0.003 to 5 wt. %, still more preferably from 0.01 to 3 wt. % in terms of a metal weight based on the total weight of the electrodeposition coating composition.

The metal ion compound can be incorporated in the electrodeposition coating composition, for example, by any of the following methods (1) to (3):

(1) A method of adding a pigment, catalyst, another additive and water to the metal ion compound, dispersing the pigment to prepare a pigment-dispersed paste in advance, and adding the resulting pigment-dispersed paste to an emulsion of the resin components.

Examples of the pigment used in the above method include coloring pigments such as titanium white and carbon black, extenders such as clay, talc, and barite; and rust inhibiting pigments such as aluminum dihydrogen tripolyphosphate and aluminum phosphomolybdate, while those of the catalyst include tin compounds, for example, organic tin compounds such as dibutyltin oxide and dioctyltin oxide; and aliphatic or aromatic carboxylates of dialkyltin such as dibutyltin dilaurate, dioctyltin dilaurate, dibutyltin diacetate, dioctyltin benzoate oxy, dibutyltin benzoate oxy, dioctyltin dibenzoate and dibutyltin dibenzoate.

(2) A method of fully mixing the resin components, and additives and water if necessary to prepare a dissolved varnish, adding thereto a neutralizing agent selected from formic acid, acetic acid, lactic acid, propionic acid, citric acid, malic acid and sulfamic acid and mixtures of one or more of them, dispersing the mixture in an aqueous medium and incorporating the metal ion compound in the resulting emulsion.

(3) A method of adding the metal ion compound, which has been diluted with water, to an electrodeposition coating composition (for example, bath paint) prepared in advance.

The electrodeposition coating composition of the invention may further contain, if necessary, another component such as a coloring pigment, an extender, a rust inhibiting pigment, an organic solvent, a pigment dispersant, a surface modifier, a surfactant, an acid, and a catalyst in an ordinary amount.

In particular, as the rust inhibiting pigments, bismuth compounds, for example, inorganic bismuth compounds such as bismuth oxide, bismuth hydroxide, basic bismuth carbonate, bismuth nitrate, and bismuth silicate can be used. Of these, bismuth hydroxide is preferred because it contributes to a further improvement in corrosion resistance.

Electrodeposition Coating Method

The electrodeposition coating composition thus prepared can be applied to the surface of a desired base material by electrodeposition coating. The electrodeposition coating can be usually performed under the conditions of a bath temperature of from 15 to 45° C. and an applied voltage of from 10 to 400V by using an electrodeposition coating composition which has been diluted with deionized water to give its solid concentration in the bath of from about 5 to 40 wt. % and has a pH adjusted to from 3.0 to 9.0.

Application of Current

It is preferred to apply current in two or more stages in the above-described electrodeposition coating for the purpose of improving corrosion resistance.

It has been found that in the multilayer electrodeposition coating method according to the invention, the rust inhibiting component (D) can be effectively precipitated on the interface between the film and an article to be coated, thereby exhibiting a higher anticorrosive effect by controlling a difference between a constant voltage ($V_1$) in the first-stage coating and a constant voltage ($V_2$) in the second-stage coating within a range of 50V or greater, time ($t_1$) necessary for the constant voltage ($V_1$) in first-stage coating within a range of from 10 to 300 seconds, and time ($t_2$) necessary for the constant voltage ($V_2$) in the second-stage coating within a range of from 30 to 360 seconds.

Although no particular limitation is imposed on the thickness of the film formed using the electrodeposition coating composition of the invention, it is usually from 10 to 40 μm in terms of a cured film. The baking temperature of the film is usually from about 120 to 200° C., preferably from about 140 to 180° C. on the surface of an article to be coated. The baking time can be set at from 5 to 60 minutes, preferably from about 10 to 30 minutes.

Articles to be Coated

Articles to which the electrodeposition coating composition of the invention is applied by the electrodeposition coating method of the invention are, for example, automobile bodies, automobile parts, electric appliances and building materials.

EXAMPLES

The present invention will hereinafter be described in further detail by Examples. It should however be borne in mind that the invention is not limited only to them. In all designations, "part" or "parts" and "%" mean "part by weight" or "parts by weight" and "wt. %", respectively.

Preparation Example 1

Preparation Example of Resin Component (A)

In a flask equipped with a stirrer, thermometer, dropping funnel and reflux condenser were added 397 parts of ethylene glycol monobutyl ether, 900 parts of "EHPE-3150" (trade name, product of Daicel Chemical, epoxy equivalent: 180), 370 parts of an amino compound (note 2), 315 parts ob diethanolamine and 1651 parts of a monophenolic compound (note 3). Under stirring, the resulting mixture was heated to 150° C. and the reaction was continued until disappearance of the epoxy residue. To the reaction mixture were added 3610 parts of bisphenol A diglycidyl ether having an epoxy equivalent of 190, 1596 parts of bisphenol A, 525 parts of diethanolamine and 1433 parts of ethylene glycol monobutyl ether. The reaction was continued at 150° C. until disappearance of the epoxy residue to give Resin No. 1 having an amine number of 65 mgKOH/g, a primary hydroxyl number of 455 mgKOH/g and a solid content of 80%.

(Note 2) Amino Compound:

In a reaction vessel equipped with a thermometer, stirrer, reflux condenser and water separator were charged 300 parts of 12-hydroxystearic acid, 104 parts of hydroxyethylaminoethylamine and 80 parts of toluene. The mixture was gradually heated while mixing under stirring. From the reaction mixture, 18 parts of water thus produced was separated and removed while removing toluene and raising the temperature as needed. The remaining toluene was distilled off under reduced pressure to give an amino compound having an amine number of 148 mgKOH/g and a coagulation point of 69° C.

(Note 3) Monophenolic Compound:

In a flask equipped with a stirrer, thermometer, dropping funnel and reflux condenser were charged 105 parts of diethanolamine, 760 parts of bisphenol A diglycidyl ether having an epoxy equivalent of 190, 456 parts of bisphenol A and 330 parts of ethylene glycol monobutyl ether. The reaction was continued at 150° C. until the disappearance of the epoxy residue to afford a phenolic compound having a solid content of 80%.

Preparation Example 2

Preparation Example (1) of Resin Component (B)

In a flask equipped with a stirrer, thermometer, dropping funnel and reflux condenser were charged 120 parts of "Maruka Lyncure S-2P" (trade name of poly-4-biphenylphenol, product of Maruzen Petrochemical) and 120 parts of ethylene glycol monobutyl ether. The temperature of the resulting mixture was raised to 90° C. to dissolve poly-4-biphenylphenol therein.

To the resulting solution were added 35 parts of monomethyl ethanolamine, 40 parts of 37% formalin and 10 parts of ethylene glycol monobutyl ether and the resulting mixture was reacted at 90° C. for 4 hours. To the reaction mixture was added 80 parts of ethylene glycol monobutyl ether further to afford Resin No. 2 having a solid content of 40%.

Preparation Example 3

Preparation Example (2) of Resin Component (B)

In a flask equipped with a stirrer, thermometer, dropping funnel and reflux condenser were charged 120 parts of "Maruka Lyncure S-2P" (trade name of poly-4-biphenylphenol, product of Maruzen Petrochemical) and 120 parts of ethylene glycol monobutyl ether. The temperature of the resulting mixture was raised to 90° C. to dissolve poly-4-biphenylphenol therein.

To the resulting solution were added 55 parts of monomethyl ethanolamine, 50 parts of 37% formalin and 10 parts of ethylene glycol monobutyl ether and the resulting mixture was reacted at 90° C. for 4 hours. To the reaction mixture was added 100 parts of ethylene glycol monobutyl ether further to afford Resin No. 3 having a solid content of 40%.

Preparation Example 4

Preparation of Curing Agent

To 270 parts of "Cosmonate M-200" (trade name of crude MDI, product of Mitsui Chemicals) was added 46 parts of methyl isobutyl ketone, followed by temperature increase to 70° C. After addition of 281 parts of diethylene glycol monoethyl ether in portions, the temperature of the resulting mixture was raised to 90° C. While keeping this temperature, sampling was performed with the passage of time. After confirmation of the disappearance of the absorption of unreacted isocyanate by infrared absorption spectrum, the reaction was terminated. The solvent amount was then adjusted, whereby a blocked polyisocyanate compound having a solid content of 90% was obtained as a curing agent.

Preparation Example 5

Emulsion No. 1

After 75 parts (solid content: 60 parts) of Resin No. 1 obtained in Preparation Example 1 and having a solid content of 80%, 25 parts (solid content: 10 parts) of Resin No. 2 obtained in Preparation Example 2 and having a solid content of 40%, 33.3 parts (solid content: 30 parts) of the curing agent obtained in Preparation Example 4 and 10.7 parts of 10% formic acid were mixed and uniformly stirred, 150 parts of deionized water was added dropwise over about 15 minutes while vigorously stirring. As a result, Emulsion No. 1 having a solid content of 34% was obtained.

Preparation Examples 6 to 11

Emulsions Nos. 2 to 7

In a similar manner to that employed in Preparation Example 5 except for the use of compositions as described below in Table 1, Emulsions Nos. 2 to 7 having a solid content of 34% were obtained.

TABLE 1

| Emulsion | | Prep. Ex. 5 No. 1 | Prep. Ex. 6 No. 2 | Prep. Ex. 7 No. 3 | Prep. Ex. 8 No. 4 | Prep. Ex. 9 No. 5 | Prep. Ex. 10 No. 6 | Prep. Ex. 11 No. 7 |
|---|---|---|---|---|---|---|---|---|
| Resin component (A) Solid content: 80% | Resin No. 1 | 75 (60) | 81 (65) | 75 (60) | 81 (65) | 88 (70) | | |
| Resin component (B) Solid content: 40% | Resin No. 2 | 25 (10) | 13 (5) | | | | 175 (70) | |
| | Resin No. 3 | | | 25 (10) | 13 (5) | | | 175 (70) |

TABLE 1-continued

| Emulsion | | Prep. Ex. 5 No. 1 | Prep. Ex. 6 No. 2 | Prep. Ex. 7 No. 3 | Prep. Ex. 8 No. 4 | Prep. Ex. 9 No. 5 | Prep. Ex. 10 No. 6 | Prep. Ex. 11 No. 7 |
|---|---|---|---|---|---|---|---|---|
| Blocked polyisocyanate compound (C) | Curing agent | 33.3 (30) | 33.3 (30) | 33.3 (30) | 33.3 (30) | 33.3 (30) | 33.3 (30) | 33.3 (30) |
| 10% Formic acid | | 10.7 | 10.7 | 10.7 | 10.7 | 10.7 | 10.7 | 10.7 |
| Deionized water | | 150 | 156 | 150 | 156 | 162 | 75 | 75 |
| | | 294 (100) | 294 (100) | 294 (100) | 294 (100) | 294 (100) | 294 (100) | 294 (100) |

Preparation Example 12

Preparation Example of Pigment-Dispersed Paste No. 1

Pigment dispersed paste No. 1 having a solid content of 55.0% was obtained by mixing and dispersing 4.38 parts (solid content: 3.5 parts) of 80% Resin No. 1 obtained in Preparation Example 1, 1.5 parts of 10% acetic acid, 3 parts of zirconium hydrofluoric acid, 14.5 parts of "JR-600E" (note 4), 0.3 part of "Carbon MA-7" (note 5), 7.0 parts of "Hydride PXN" (note 6), 1 part of dioctyltin oxide and 21.6 parts of deionized water.

Preparation Examples 13 to 18

Preparation Examples of Pigment-Dispersed Pastes Nos. 2 to 7

In a similar manner to that employed in Preparation Example 12 except for the use of compounds listed in Table 2 instead of zirconium hydrofluoric acid, Pigment-dispersed pastes Nos. 2 to 7 were obtained.

TABLE 2

| Pigment-dispersed paste | | Prep. Ex. 12 No. 1 | Prep. Ex. 13 No. 2 | Prep. Ex. 14 No. 3 | Prep. Ex. 15 No. 4 | Prep. Ex. 16 No. 5 | Prep. Ex. 17 No. 6 |
|---|---|---|---|---|---|---|---|
| Pigment dispersing resin | Resin No. 1, solid content: 80% | 4.4 (3.5) | 4.4 (3.5) | 4.4 (3.5) | 4.4 (3.5) | 4.4 (3.5) | 4.4 (3.5) |
| Neutralizing agent | 10% Acetic acid | 1.5 | 1.5 | 1.5 | 1.5 | 1.5 | 1.5 |
| Rust-inhibiting component (D) | Zirconium hydrofluoric acid | 3 | | | | | |
| | Titanium hydrofluoric acid | | 3 | | | | |
| | Zirconyl nitrate | | | 3 | | | |
| | Aluminum dihydrogen tripolyphosphate | | | | 3 | | |
| | Zinc acetate | | | | | 3 | |
| Coloring pigment | "JR-600E" (Note 4) | 14.5 | 14.5 | 14.5 | 14.5 | 14.5 | 14.5 |
| | "Carbon MA-7" (Note 5) | 0.3 | 0.3 | 0.3 | 0.3 | 0.3 | 0.3 |
| Extender | "Hydride PXN" (Note 6) | 7 | 7 | 7 | 7 | 7 | 7 |
| Organic tin | Dioctyltin oxide | 1 | 1 | 1 | 1 | 1 | 1 |
| Deionized water | | 21.6 | 21.6 | 21.6 | 21.6 | 21.6 | 19.1 |
| Pigment-dispersed paste, solid content: 55% | | 53.5 (29.3) | 53.5 (29.3) | 53.5 (29.3) | 53.5 (29.3) | 53.5 (29.3) | 47.8 (26.3) |

(Note 4)
"JR-600E", trade name of titanium white, product of TAYCA (Note 5)
"Carbon MA-7", trade name of carbon black, product of Mitsubishi Chemical (Note 6)
"Hydride PXN", trade name of aluminum silicate, product of Georgia Kaolin

EXAMPLES AND COMPARATIVE EXAMPLES

Example 1

Electrodeposition coating composition No. 1 having a solid content of 20% was obtained by adding 53.3 parts (solid content: 29.3 parts) of Pigment-dispersed paste No. 1 obtained in Preparation Example 12 and 299.2 parts of deionized water to 294 parts (solid content: 100 parts) of Emulsion No. 1 obtained in Preparation Example 5.

Examples 2 to 7

Electrodeposition coating compositions Nos. 2 to 7 were obtained in a similar manner to that employed in Example 1 except for the use of the compositions as described below in Table 3.

TABLE 3

| Electrodeposition coating composition | | Ex. 1 No. 1 | Ex. 2 No. 2 | Ex. 3 No. 3 | Ex. 4 No. 4 | Ex. 5 No. 5 | Ex. 6 No. 6 | Ex. 7 No. 7 |
|---|---|---|---|---|---|---|---|---|
| Components of coating composition | Emulsion No. 1 | 294 (100) | | | | 294 (100) | 294 (100) | |
| | Emulsion No. 2 | | 294 (100) | | | | | |
| | Emulsion No. 3 | | | 294 (100) | | | | 294 (100) |
| | Emulsion No. 4 | | | | 294 (100) | | | |
| | Pigment-dispersed paste No. 1 | 53.3 (29.3) | 53.3 (29.3) | 53.3 (29.3) | 53.3 (29.3) | | | |
| | Pigment-dispersed paste No. 2 | | | | | 53.3 (29.3) | | |
| | Pigment-dispersed paste No. 3 | | | | | | 53.3 (29.3) | 53.3 (29.3) |
| | Deionized water | 299.2 | 299.2 | 299.2 | 299.2 | 299.2 | 299.2 | 299.2 |
| 20% Bath | | 646.5 (129.3) | 646.5 (129.3) | 646.5 (129.3) | 646.5 (129.3) | 646.5 (129.3) | 646.5 (129.3) | 646.5 (129.3) |

Comparative Example 1

Electrodeposition coating composition No. 8 having a solid content of 20% was obtained by adding 53.3 parts (solid content: 29.3 parts) of Pigment-dispersed paste No. 1 obtained in Preparation Example 12 and 299.2 parts of deionized water to 294 parts of Emulsion No. 5 (solid content: 100 parts) obtained in Preparation Example 9.

Comparative Examples 2 to 6

In a similar manner to that employed in Comparative Example 1 except for the use of the components as described below in Table 4, Electrodeposition coating compositions Nos. 9 to 13 were obtained.

TABLE 4

| Electrodeposition coating composition | | Comp. Ex. 1 No. 8 | Comp. Ex. 2 No. 9 | Comp. Ex. 3 No. 10 | Comp. Ex. 4 No. 11 | Comp. Ex. 5 No. 12 | Comp. Ex. 6 No. 13 |
|---|---|---|---|---|---|---|---|
| Components of coating composition | Emulsion No. 1 | | | | 294 (100) | 294 (100) | 294 (100) |
| | Emulsion No. 5 | 294 (100) | | | | | |
| | Emulsion No. 6 | | 294 (100) | | | | |
| | Emulsion No. 7 | | | 294 (100) | | | |
| | Pigment-dispersed paste No. 1 | 53.3 (29.3) | 53.3 (29.3) | 53.3 (29.3) | | | |
| | Pigment-dispersed paste No. 4 | | | | 53.3 (29.3) | | |
| | Pigment-dispersed paste No. 5 | | | | | 53.3 (29.3) | |

TABLE 4-continued

| Electrodeposition coating composition | Comp. Ex. 1 No. 8 | Comp. Ex. 2 No. 9 | Comp. Ex. 3 No. 10 | Comp. Ex. 4 No. 11 | Comp. Ex. 5 No. 12 | Comp. Ex. 6 No. 13 |
|---|---|---|---|---|---|---|
| Pigment-dispersed paste No. 6 | | | | | | 47.8 (26.3) |
| Deionized water | 299.2 | 299.2 | 299.2 | 299.2 | 299.2 | 289.7 |
| 20% Bath | 646.5 (129.3) | 646.5 (129.3) | 646.5 (129.3) | 646.5 (129.3) | 646.5 (129.3) | 631.5 (126.3) |

Preparation of Test Plate

Test Plate (1) (No Chemical Conversion Treatment)

Electrodeposition coating was given to a cold rolled steel plate, which had not been subjected to chemical conversion treatment, by using the electrodeposition coating compositions obtained in Examples and Comparative Examples while increasing the pressure over 30 seconds slow-start and maintaining at 200V for 2.5 minutes, 3 minutes in total. Baking at 170° C. for 20 minutes yielded Test plate 1 having a dry film thickness of 20 μm.

Test Plate (2) (No Chemical Conversion Treatment)

After applying current for 1 minute at 20V and increasing the pressure over 30 seconds, electrodeposition coating was given to a cold rolled steel plate, which had not been subjected to chemical conversion treatment, at 200V for 2 minutes by using the electrodeposition coating compositions obtained in Examples and Comparative Examples. Baking at 170° C. for 20 minutes yielded Test plate 2 having a dry film thickness of 20 μm.

Test Plate 3 (Subjected to Chemical Conversion Treatment)

After chemical conversion treatment was given to a cold rolled steel plate with "PALBOND #3020" (trade name of a zinc phosphate treating agent; product of Nihon Parkerizing), electrodeposition coating was performed using electrodeposition coating compositions obtained in Examples and Comparative Examples while increasing the pressure over 30 seconds and maintaining at 200V for 2.5 minutes, 3 minutes in total. Baking at 170° C. for 20 minutes yielded Test plate 3 having a dry film thickness of 20 μm.

Test Plate 4: (Galvanized Steel Plate):

Electrodeposition coating was given to a galvanized steel plate, which had not been subjected to chemical conversion treatment, by using the electrodeposition coating compositions obtained in Examples or Comparative Examples while increasing the pressure over 30 seconds and maintaining at 200V for 2.5 minutes, 3 minutes in total. Baking at 170° C. for 20 minutes yielded Test plate 4 having a dry film thickness of 20 μm.

Test Plates 1 to 4 were provided for the test under the below-described test conditions. Results of Examples are shown in Table 5, while those of Comparative Examples are shown in Table 6.

TABLE 5

| Electrodeposition coating composition | | Ex. 1 No. 1 | Ex. 2 No. 2 | Ex. 3 No. 3 | Ex. 4 No. 4 | Ex. 5 No. 5 | Ex. 6 No. 6 | Ex. 7 No. 7 |
|---|---|---|---|---|---|---|---|---|
| (Note 7) Warm salt water exposure resistance | Test plate 1 (cold rolled steel plate without chemical conversion treatment) | B | B | B | B | B | B | B |
| | Test plate 2 (cold rolled steel plate without chemical conversion treatment, different coating method) | A | A | A | A | B | B | B |
| | Test plate 3 (cold rolled steel plate subjected to chemical conversion treatment) | A | A | A | A | A | A | A |
| | Test plate 4 (galvanized steel plate without chemical conversion treatment) | A | A | A | A | A | A | A |
| (Note 8) Suitability of electrodeposition coating to rustproof steel plate | | B | B | B | B | B | B | B |
| (Note 9) Finish appearance | | B | B | B | B | B | B | B |
| (Note 10) Stability of coating composition | | B | B | B | B | B | B | B |

TABLE 6

|  | Electrodeposition coating composition | Comp. Ex. 1 No. 8 | Comp. Ex. 2 No. 9 | Comp. Ex. 3 No. 10 | Comp. Ex. 4 No. 11 | Comp. Ex. 5 No. 12 | Comp. Ex. 6 No. 13 |
|---|---|---|---|---|---|---|---|
| (Note 7) Warm salt water exposure resistance | Test plate 1 (cold rolled steel plate without chemical conversion treatment) | C | C | C | C | C | D |
|  | Test plate 2 (cold rolled steel plate without chemical conversion treatment, different coating method) | C | C | C | C | C | D |
|  | Test plate 3 (cold rolled steel plate subjected to chemical conversion treatment) | B | B | B | BC | BC | D |
|  | Test plate 4 (galvanized steel plate without chemical conversion treatment) | B | B | B | BC | BC | BC |
| (Note 8) Suitability of electrodeposition coating to a rustproof steel plate |  | B | D | D | C | C | B |
| (Note 9) Finish appearance |  | B | D | D | C | C | B |
| (Note 10) Stability of coating composition |  | B | D | D | B | C | B |

(Note 7)
Test on warm salt water exposure resistance: Test plates 1 to 4 were dipped in 5 wt. % salt water of 50° C. for 480 hours and a peeling ratio (%) was evaluated based on the Sellotape (trade mark) peeling test.
A: peeling ratio of a film is less than 5% relative to the whole film
B: peeling ratio of a film is 5% or greater but less than 10% relative to the whole film
BC: peeling ration of a film is 10% or greater but less than 15% relative to the whole film
C: peeling ration of a film is 15% or greater but less than 20% relative to the whole film
D: peeling ratio of a film is 20% or greter based on the whole film.
(Note 8)
Suitability of electrodeposition coating to rustproof steel plate:
A galvanized steel plate subjected to chemical conversion treatment (with "Palbond #3020" (trade name of a zinc phosphate treating agent, product of Nihon Parkerizing) was used as an article to be coated. After electrodeposition at a bath temperature of 28° C. and a voltage to give a film thickness of 20 μm, the resulting plate was baked and dried at 170° C. for 20 minutes. The number of pin holes in the coated plate (10 cm × 10 cm) was counted.
A: no pin holes was observed
B: 1 to 5 pin holes were observed
C: 6 or more pin holes were observed
(Note 9)
Finish appearance
Surface roughness (Ra) on the coated surface of Test plate 1 was measured using "Surfcom 301" (trade name of surface roughness meter, product of MITSUTOYC).
A: surface roughness (Ra) is less than 0.2
B: surface roughness (Ra) is 0.2 or greater but less than 0.3.
C: surface roughness (Ra) is 0.3 or greater
(Note 10)
Stability of coating composition:
The upper surface of a container containing each electrodeposition coating composition was opened at 30° C. for 4 weeks. After stirring, an amount of the composition remaining after filtration through a 400-mesh sieve was measured.
A: less than 10 mg/L
B: 10 mg/L or greater but less than 15 mg/L
C: 15 mg/L or greater.
The electrodeposition coating composition of the invention can form a film excellent in corrosion resistance and finish appearance and at the same time, has good stability so that it is effectively used for electrodeposition coating of a steel plate and the like.

480 hours and a peeling ratio (%) was evaluated based on the Sellotape (trade mark) peeling test.
A: peeling ratio of a film is less than 5% relative to the whole film
B: peeling ratio of a film is 5% or greater but less than 10% relative to the whole film
BC: peeling ration of a film is 10% or greater but less than 15% relative to the whole film
C: peeling ration of a film is 15% or greater but less than 20% relative to the whole film
D: peeling ratio of a film is 20% or greater based on the whole film.

(Note 8) Suitability of Electrodeposition Coating to Rustproof Steel Plate:

A galvanized steel plate subjected to chemical conversion treatment (with "Palbond #3020" (trade name of a zinc phosphate treating agent, product of Nihon Parkerizing) was used as an article to be coated. After electrodeposition at a bath temperature of 28° C. and a voltage to give a film thickness of 20 μm, the resulting plate was baked and dried at 170° C. for 20 minutes. The number of pin holes in the coated plate (10 cm×10 cm) was counted.

A: no pin holes was observed
B: 1 to 5 pin holes were observed
C: 6 or more pin holes were observed (Note 9) Finish Appearance Surface roughness (Ra) on the coated surface of Test plate 1 was measured using "Surfcom 301" (trade name of surface roughness meter, product of MITSUTOYO).

A: surface roughness (Ra) is less than 0.2
B: surface roughness (Ra) is 0.2 or greater but less than 0.3.
C: surface roughness (Ra) is 0.3 or greater (Note 10) Stability of Coating Composition:

The upper surface of a container containing each electrodeposition coating composition was opened at 30° C. for 4 weeks. After stirring, an amount of the composition remaining after filtration through a 400-mesh sieve was measured.
A: less than 10 mg/L
B: 10 mg/L or greater but less than 15 mg/L
C: 15 mg/L or greater.

The electrodeposition coating composition of the invention can form a film excellent in corrosion resistance and finish appearance and at the same time, has good stability so that it is effectively used for electrodeposition coating of a steel plate and the like.

What is claimed is:

1. An electrodeposition coating composition comprising a resin component (A), a resin component (B), a blocked polyisocyanate compound (C) and at least one rust inhibiting component (D) selected from a group consisting of ions of a metal selected from zirconium, titanium, cobalt, vanadium, tungsten and molybdenum, oxymetal ions of the metal and fluorometal ions of the metal;

wherein the resin component (A) comprises a first resin obtained by reacting an epoxy resin ($b_1$) having, in one molecule thereof, at least two epoxy-containing functional groups represented by the following formula (1):

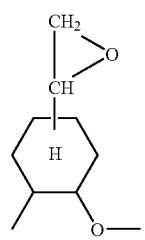

Formula (1)

and an amino compound ($b_2$) and/or ($b_3$) a phenolic compound; and the resin component (B) is one selected from a second resin having a unit represented by the following formula (2), an acid salt of the second resin, and a mixture of the second resin and the acid salt:

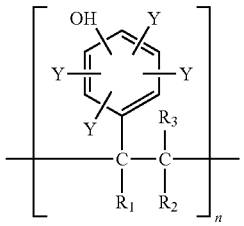

Formula (2)

(wherein, $R_1$ to $R_3$ each represents a hydrogen atom or a $C_{1-5}$ alkyl group, Y represents a hydrogen atom, $CR_4R_5OR_6$, $CH_2Cl$, $C_{1-18}$ alkyl group, $C_{1-18}$ aryl group or Z, wherein Z is represented by the formula (3):

Formula (3)

wherein $R_4$ to $R_{10}$ each represents a hydrogen atom, alkyl group, aryl group, hydroxyalkyl group, aminoalkyl group, mercaptoalkyl group or phosphoalkyl group, and wherein n stands for an integer of from 2 to 400); and wherein the resin component (A), resin component (B) and blocked polyisocyanate compound (C) are in amounts of from 50 to 80 wt. %, from 0.5 to 25 wt. % and from 5 to 40 wt. %, respectively, based on total weight of solid contents of the components (A), (B) and (C).

2. The electrodeposition coating composition according to claim 1, further comprises a rust inhibiting component (D) in an amount of from 0.01 to 30 wt. % based on the total weight of solid contents of the resin component (A), the resin component (B) and the blocked polyisocyanate compound (C).

3. The electrodeposition coating composition according to claim 1, wherein a ratio of mole number of Z divided by mole number of benzene rings in the formula (2) falls in 0.1 to 2.

4. The electrodeposition coating composition according to claim 1, wherein the rust inhibiting component (D) is in an amount of from 0.001 wt. % to 10 wt. % in terms of a metal amount relative to the total amount of the solids of the electrodeposition coating composition.

5. An electrodeposition coating method comprising:
preparing the electrodeposition coating composition as claimed in any one of claims 1, 2, 3, and 4;
setting a constant voltage $V_1$ in a first stage coating and a constant voltage $V_2$ in a second stage coating wherein the second constant voltage is 50V or more greater than the first constant voltage;
wherein a first stage coating time with the constant voltage $V_1$ is from 10 to 300 seconds and/or a second stage coating time with the constant voltage $V_2$ is from 30 to 360 seconds.

6. A coated article having a coating obtained by electrodeposition of an electrodeposition coating composition as claimed in any one of claims 1, 2, 3, and 4.

* * * * *